(12) United States Patent
Trumbull et al.

(10) Patent No.: US 9,400,677 B2
(45) Date of Patent: Jul. 26, 2016

(54) ADAPTIVE HANDLING OF PRIORITY INVERSIONS USING TRANSACTIONS

(71) Applicant: Apple Inc., Cupertino, CA (US)

(72) Inventors: Benjamin C. Trumbull, San Jose, CA (US); Adam C. Swift, San Jose, CA (US); Russell A. Blaine, San Francisco, CA (US); Benjamin H. Nham, San Francisco, CA (US); Kari E. Christianson, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 13/893,631

(22) Filed: May 14, 2013

(65) Prior Publication Data

US 2014/0189693 A1 Jul. 3, 2014

Related U.S. Application Data

(60) Provisional application No. 61/748,341, filed on Jan. 2, 2013.

(51) Int. Cl.
*G06F 9/46* (2006.01)
*G06F 9/52* (2006.01)

(52) U.S. Cl.
CPC .............. *G06F 9/466* (2013.01); *G06F 9/526* (2013.01); *G06F 2209/522* (2013.01); *G06F 2209/523* (2013.01)

(58) Field of Classification Search
CPC ... G06F 9/466; G06F 9/526; G06F 2209/522; G06F 2209/523
USPC .................................. 718/100, 101, 102, 103
See application file for complete search history.

(56) References Cited

U.S. PATENT DOCUMENTS

| | | | |
|---|---|---|---|
| 5,892,955 A * | 4/1999 | Ofer | 710/200 |
| 6,504,847 B1 * | 1/2003 | Horlander | G11B 20/00086 340/3.1 |
| 6,598,068 B1 * | 7/2003 | Clark | 718/104 |
| 8,201,178 B2 | 6/2012 | Kawachiya et al. | |
| 8,286,182 B2 | 10/2012 | Chan | |
| 2002/0178208 A1 * | 11/2002 | Hutchison et al. | G06F 9/52 718/102 |
| 2003/0167268 A1 * | 9/2003 | Kumar | G06F 17/30362 |
| 2004/0019639 A1 * | 1/2004 | E | G06F 9/526 709/205 |
| 2005/0060710 A1 * | 3/2005 | Kush | 718/103 |
| 2005/0080824 A1 * | 4/2005 | Vaidyanathan et al. | 707/201 |
| 2006/0282836 A1 * | 12/2006 | Barker | 718/103 |
| 2007/0124546 A1 | 5/2007 | Blanchard et al. | |
| 2008/0005737 A1 * | 1/2008 | Saha | G06F 9/3004 718/100 |
| 2009/0271794 A1 * | 10/2009 | Zoll et al. | 718/103 |
| 2012/0005684 A1 * | 1/2012 | Ziarek | 718/103 |
| 2012/0222035 A1 * | 8/2012 | Plondke | G06F 9/4881 718/103 |

* cited by examiner

*Primary Examiner* — Meng An
*Assistant Examiner* — Willy W Huaracha
(74) *Attorney, Agent, or Firm* — Blakely, Sokoloff, Taylor & Zafman LLP

(57) ABSTRACT

An operating system of a data processing system receives a request from a first process to acquire an exclusive lock for accessing a resource of the data processing system. A second priority of a second process is increased to reduce total execution time. The second process is currently in possession of the exclusive lock for performing a transactional operation with the resource. The second priority was lower than a first priority of the first process. The operating system notifies the second process to indicate that another process is waiting for the exclusive lock to allow the second process to complete or roll back the transactional operation and to release the exclusive lock thereafter.

18 Claims, 7 Drawing Sheets

ADAPTIVE HANDLING OF PRIORITY INVERSIONS USING TRANSACTIONS

RELATED APPLICATIONS

This application claims the benefit of U.S. Provisional Patent Application No. 61/748,341, filed Jan. 2, 2013, which is incorporated by reference herein in its entirety.

FIELD OF THE INVENTION

Embodiments of the present invention relate generally to data processing systems. More particularly, embodiments of the invention relate to resource management of a data processing system.

BACKGROUND

In a typical data processing system, multiple processes or threads may be executed simultaneously and these processes may compete for exclusive access of a particular resource such as a file or database. A single thread possesses a particular lock for exclusive access of a particular resource at a time. Different threads may vie for ownership of the lock. These threads may have different priorities assigned to them by the system. Typically, threads servicing immediate user instigated actions have higher priorities than long running background tasks. After a thread has won ownership of the lock and begun executing within the critical session, it typically cannot have its ownership preempted. Even if such a thread is the highest priority thread at the time it acquired the lock, an even higher priority thread may come later and become blocked. As a result, the higher priority thread has to wait for the lower priority thread to finish its current transactional operations and release the lock. This sort of priority inversion can result in reduced overall user responsiveness and/or performance.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
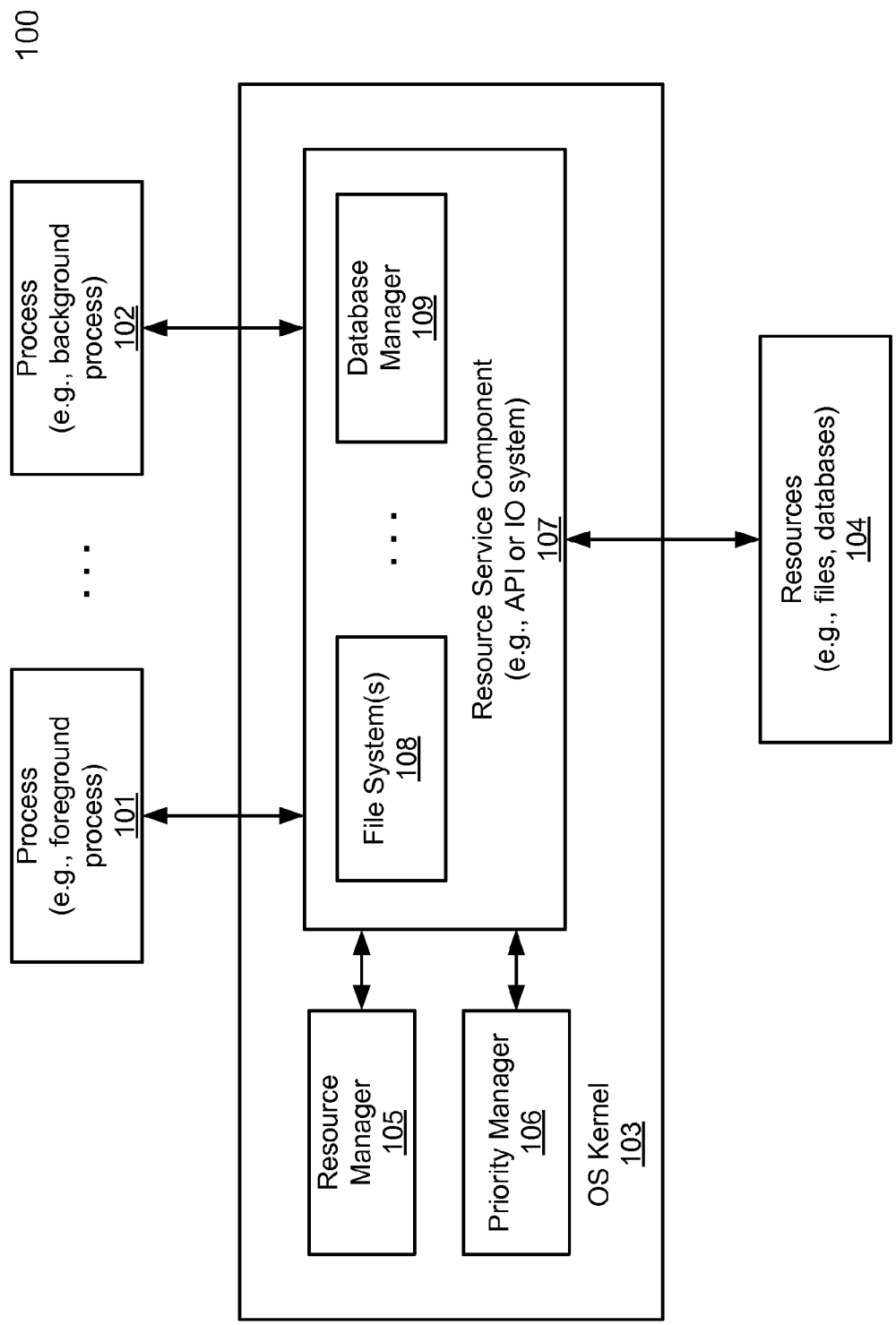
FIG. 1 is a block diagram illustrating a structure of an operating system according to one embodiment of the invention.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a system is designed to improve handling of priority inversions around critical resources by terminating the lower priority ownership of the lock for accessing the resource and utilizing a recovery mechanism. In one embodiment, the priority of a lower priority process, which is in possession of ownership of the lock, is boosted to at least match the priority of a higher priority process, which is waiting for the lock for accessing the resource. The increased priority is to reduce the total lock hold time of the lower priority process, by enabling the lower priority process to finish its current transactional operation (e.g., critical section) quicker but otherwise release the lock to the higher priority process in the normal fashion after the full completion of its current transactional operation.

For critical sections paired with a natural recovery mechanism such as database transactions or software transaction memory, it is possible to go further and preempt the current execution of the critical section, such that the higher priority process or thread may assume ownership of the lock even sooner. According to one embodiment, the system (e.g., a kernel of an operating system) receives a request from a first process (e.g., a higher priority thread) to acquire a lock for accessing a resource, where the lock is currently owned by a second process (e.g., a lower priority thread) that is currently performing a transactional operation on the resource. In response to the request, the system increases a second priority of the second process to at least match a first priority of the first process. In addition, the system notifies the second process indicating that there is another process waiting for the lock, such that the second process can either complete the transaction with the increased priority or roll back the transaction, and thereafter release the lock sooner.

According to another embodiment, in response to the request received from the first process, the system invokes the input/output (IO) subsystem to reject any further access to the resource from the second process by returning a predetermined error. Such an error message may cause the second process to abort further access to the resource, such as rolling back the current transaction, and to release the lock thereafter. According to a further embodiment, instead of waiting for the second process to roll back and to release the lock, the system may immediately revoke or terminate the ownership of the lock from the second process, and perform the rollback operation on behalf of the second process. Thereafter, the lock is allocated or assigned to the first process, without having to wait for the second process.

FIG. 1 is a block diagram illustrating a structure of an operating system according to one embodiment of the invention. For example, system 100 may represent a variety of operating systems, such as iOS or Mac OS from Apple Inc., Windows from Microsoft Corporation, LINUX/UNIX, other real-time or embedded operating systems. Referring to FIG.

1, system 100 includes, but is not limited to, one or more processes (e.g., threads) 101-102 coupled to kernel 103 of the operating system, where processes 101-102 access resources 104 via resource service component or interface 107. Resource service component 107 may include a variety of specific service components, such as file system interface 108 and database manager 109, for accessing a variety of resources 104. For example, service component 107 may be part of a virtual file system (VFS) that provides an interface to a variety of different types of file systems, such as a network file system (NFS).

Kernel 103 further includes a resource manager 105 and a priority manager 106. Resource manager 105 is responsible to keep track resource usage by processes 101-102. Resource manager 105 is responsible for allocating or deallocating memory or other hardware resources (e.g., processor or processor core resources) for processes 101-102. Priority manager 106 is responsible for assigning and modifying priorities for processes 101-102. Resource manager 105 can then manage resource usages of processes 101-102 based on their respective priorities. Typically, a process with a higher priority can obtain resources quicker than a process with a lower priority. By increasing a priority of a process, priority manager 106 increases that particular process's chances to successfully compete against other processes for acquiring resources. Similarly, a lower priority lowers the chances of the corresponding process against other processes for acquiring resources.

In this example, it is assumed process 101 has a higher priority than process 102. It is also assumed that process 102 acquires a lock for exclusive access of resource 104 and subsequently process 101 requests an exclusive access to the same resource 104. In one embodiment, the priority of process 102, which is in possession of ownership of the lock, is boosted by priority manager 106 to at least match the priority of process 101, which is waiting for the clock for accessing resource 104. The increased priority is to reduce the blockage of process 102, which allows process 102 to finish the current transactional operation (e.g., critical section) quicker but otherwise release the lock to process 101 in the normal fashion after the full completion of the current transactional operation.

For critical sections paired with a natural recovery mechanism such as database transactions or software transaction memory, it is possible to go further and preempt the current execution of the critical section, such that process 101 may assume ownership of the lock even sooner. According to one embodiment, kernel 103 receives a request from process 101 (e.g., a higher priority thread) to acquire a lock for accessing resource 104, where the lock is currently owned by process 102 (e.g., a lower priority thread) that is currently performing a transactional operation on resource 104. In response to the request, the system increases a second priority of process 102 to at least match a first priority of process 101. In addition, the system notifies process 102 indicating that there is another process (such as process 101) waiting for the lock, such that process 102 can either complete the transaction with the increased priority or roll back the transaction, and thereafter release the lock sooner. In this embodiment, the system communicating with process 102 via notification is referred to as operating in a cooperative mode.

According to another embodiment, in response to the request received from process 101, the system invokes the input/output (IO) subsystem (e.g., resource service component 107) to reject any further access to the resource from process 102 by returning a predetermined error. Such an error message may cause process 102 to abort further access to resource 104, such as rolling back the current transaction, and to release the lock thereafter. In this embodiment the system is referred to as operating in a partially cooperative mode. According to a further embodiment, instead of waiting for process 102 to roll back and to release the lock, the system may immediately revoke or terminate the ownership of the lock from process 102, and perform the rollback operation on behalf of process 102. Thereafter, the lock is allocated or assigned to process 101, without having to wait for process 102. In this embodiment the system is referred to as operating in a non-cooperative mode.

In the cooperative mode, according to one embodiment, after the system (typically the kernel) mediating the locks determines a higher priority thread is waiting for the lock, it may send a message to the lower priority process currently owning the lock. The lower priority process may asynchronously handle the message to instruct itself to cease further work on the resource (e.g., critical section) and release the lock as soon as possible. In one embodiment, this communication may be done by setting a flag that code within the critical section would periodically check. Upon determination that a higher priority thread is waiting, the code operating within the critical section of the lower priority thread may cease its work and execute the recovery mechanism, such as rolling back the database transaction, or alternatively, the lower priority thread may finish the transaction as soon as possible if it is deemed to be reasonable.

In one embodiment, after rolling back, the lower priority owner releases the lock. It would then attempt to re-acquire the lock. At this point the system mediating the lock would have the opportunity to prioritize the new lock owner. The previous owner would wait until it was the highest priority thread still contending for ownership. Once it has re-acquired the lock, it would replay the operation it had aborted (e.g. replay the rolled back database transaction). In this model, owners who allow themselves to be pre-empted need to maintain enough state before the critical section starts such that they can replay their attempted operations within the critical section multiple times. An example of this would be a system which maintains in memory the data it wishes to update in its next database transaction. After the transaction is rolled back, it can simply try a new transaction again from the same in-memory state.

Figure 2:
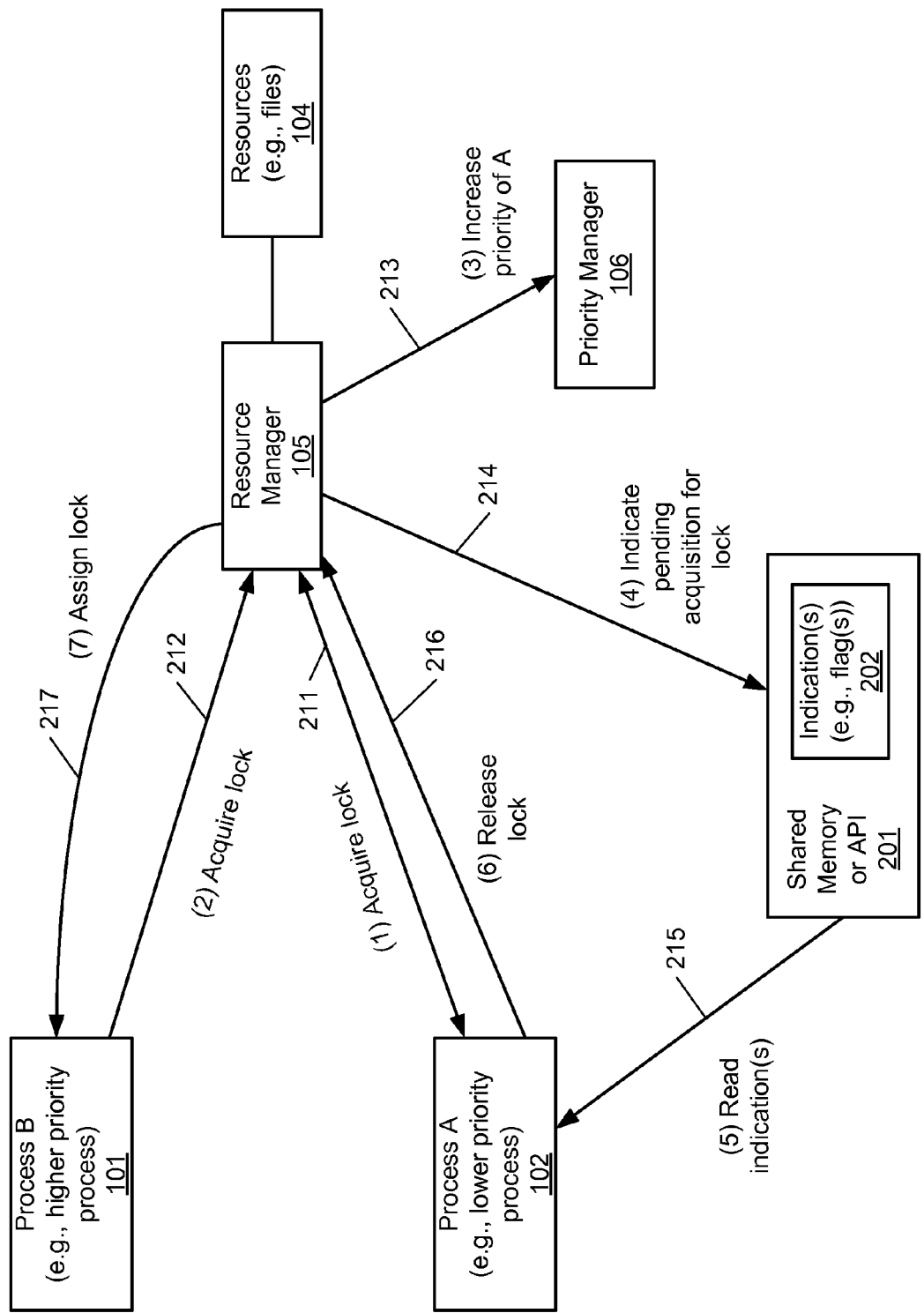
FIG. 2 is a block diagram illustrating a process for resource management in a cooperative mode according to one embodiment of the invention.

FIG. 2 is a block diagram illustrating a process for resource management in a cooperative mode according to one embodiment of the invention. Referring to FIG. 2, process 102 (e.g., a lower priority thread) initially acquires a lock for exclusive access of resource 104 from resource manager 105 via path 211. Subsequently, process 101 (e.g., a higher priority thread) requests to acquire the same lock for accessing resource 104 via path 212. In response to the request, resource manager 105 causes priority manager 106 to increase the priority of process 102 via path 312. In addition, resource manager 105 notifies process 102 that there is another process, in this example process 101, waiting for the lock for accessing the same resource 104. In one embodiment, resource manager may set a flag 202 via path 414 in a predetermined memory location 201 that is accessible by process 102 via path 215. For example, resource manager 105 may set flag 202 to a predetermined value such as logical TRUE to indicate that there is another thread waiting for the lock currently owned by process 102. In one embodiment, process 102 periodically polls the predetermined memory location 201 for flag 202. Alternatively, resource manager 105 may communicate with process 102 via an application programming interface (API). Based on flag 202, process 102 may stop or abort further access to resource 104, for example, by rolling back the current transaction operation and release the lock via path 216. Thereafter, resource manager may reassign the lock to process 101 via path 217.

Figure 3:
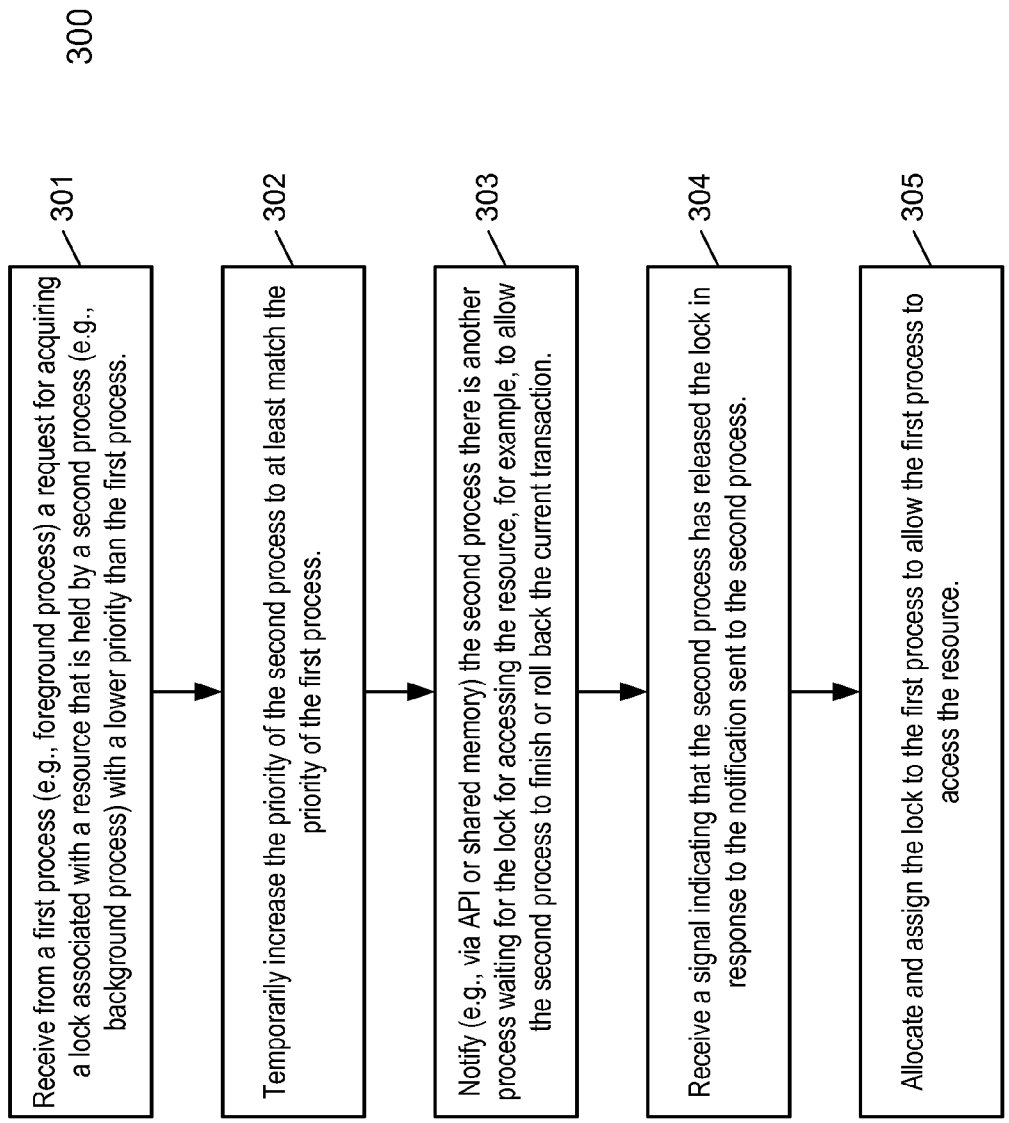
FIG. 3 is a flow diagram illustrating a method for resource management according to one embodiment of the invention.

FIG. 3 is a flow diagram illustrating a method for resource management according to one embodiment of the invention. Method 300 may be performed by the system as shown in FIG. 2, which may be implemented as processing logic including software, hardware, and a combination thereof. Referring to FIG. 3, at block 301, processing logic receives a request from a first process (e.g., a higher priority process such as a foreground process) for acquiring a lock associated with a resource (e.g., a file or database), where the lock is currently held by a second process (e.g., a lower priority process such as a background process). At block 302, processing logic temporarily increases the priority of the second process to at least match the priority of the first process. At block 303, processing logic notifies the second process that there is another thread waiting for the lock, which allows the second process to either finish the current transaction quicker or roll back the current transaction. At block 304, processing logic receives a signal that the second process has released the lock in response to the notification. In response to the signal, at block 305, the lock is reassigned to the first process to allow the first process to access the resource.

In the partially cooperative mode, according to one embodiment, the system (typically the kernel) mediating the locks may cause the lock owner to jump to a cancellation point sooner by causing routines related to the critical section's operation to return errors immediately. For example, in the case of a database holding a write lock, the kernel could cause file IO routines associated with the file descriptor for the lock owner's process to return a specific error code forcing an immediate rollback. By refusing to allow any additional IO against that file descriptor, the lock owner would have no choice but to jump to a cancellation point as soon as possible. In order to allow the recovery mechanism to proceed with a rollback, the lock owner would send a message to the kernel acknowledging the error condition and its arrival at a cancellation point. At that time, the kernel could then allow further IO against the file descriptor so that the database rollback can proceed.

Figure 4:
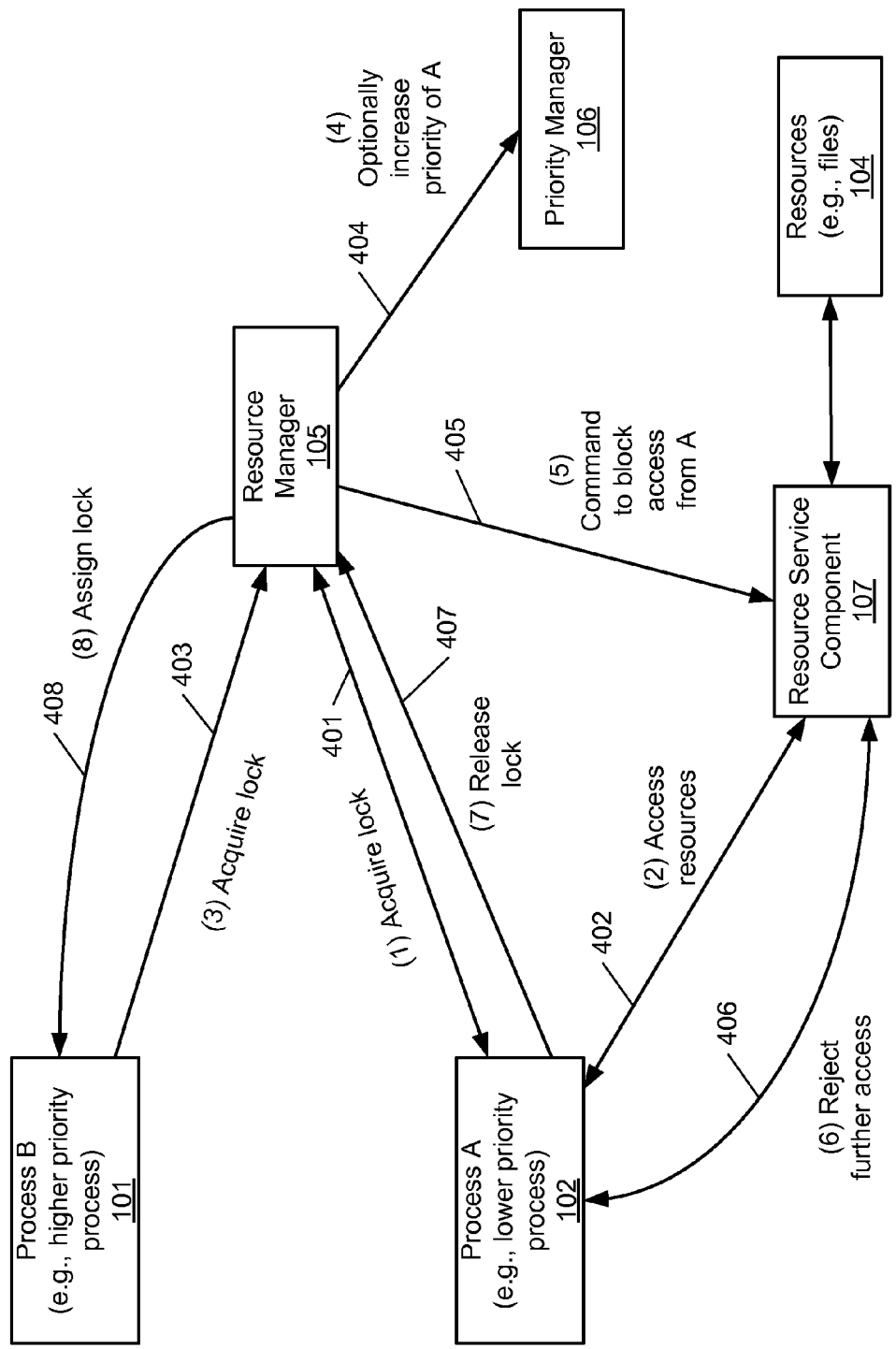
FIG. 4 is a block diagram illustrating a process in a partially cooperative mode according to one embodiment of the invention.

FIG. 4 is a block diagram illustrating a process in a partially cooperative mode according to one embodiment of the invention. Referring to FIG. 4, initially, process 102 (e.g., lower priority process) acquires the lock via path 401 from resource manager 105 and accesses resource 104 via path 402. Subsequently, process 101 (e.g., higher priority process) requests via path 403 to acquire the lock for accessing resource 104. In response to the request, resource manager 105 causes via path 404 priority manager 106 to increase the priority of process 102 to at least match the priority of process 101. In addition, resource manager 105 sends a command to resource service component 107 (e.g., IO subsystem) to block any further access to resource 104 from process 102 via path 406. Eventually, process 102 aborts the current transaction (with optional rollback) and releases the lock via path 407. Thereafter, resource manager 105 reassigns the lock to process 101.

Figure 5:
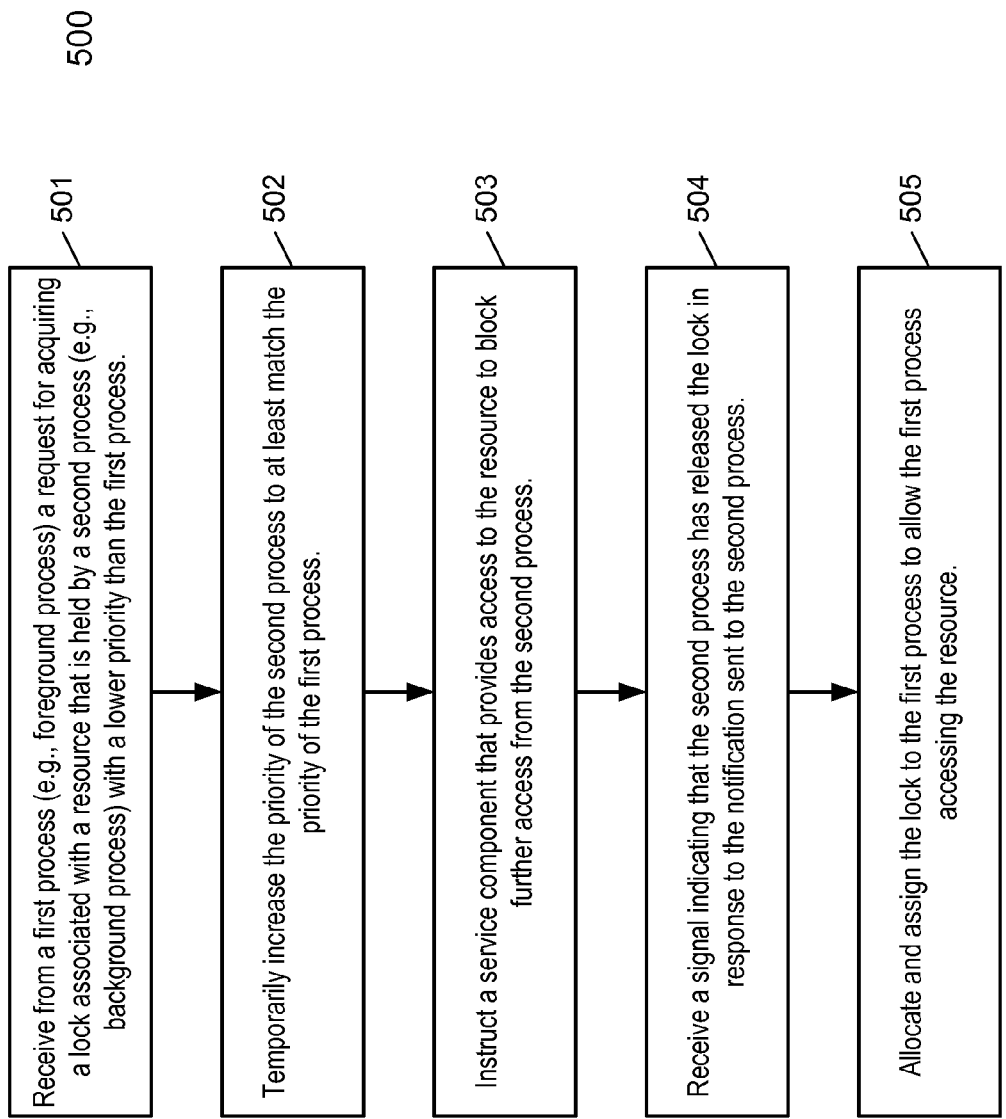
FIG. 5 is a flow diagram illustrating a method for resource management according to another embodiment of the invention.

FIG. 5 is a flow diagram illustrating a method for resource management according to another embodiment of the invention. Method 500 may be performed by the system as shown in FIG. 4, which may be implemented as processing logic including software, hardware, and a combination thereof. Referring to FIG. 5, at block 501, processing logic receives a request from a first process (e.g., a higher priority process such as a foreground process) for acquiring a lock associated with a resource (e.g., a file or database), where the lock is currently held by a second process (e.g., a lower priority process such as a background process). At block 502, processing logic temporarily increases the priority of the second process to at least match the priority of the first process. At block 503, processing logic communicates with a service component (e.g., file system or IO subsystem) to reject any further access of the resource from the second process. At block 504, processing logic receives a signal that the second process has released the lock in response to the rejection. In response to the signal, at block 505, the lock is reassigned to the first process to allow the first process to access the resource.

According to one embodiment, when the system operates in a non-cooperative mode, the system mediating the locks (typically the kernel) additionally implements the recovery mechanism itself. That is, instead of waiting for the lock owner to provide the recovery, the lock owner is pre-empted and the kernel implements the actual rollback. In the lock owner's process all routines (or potentially just writes) related to that critical section (file descriptor) fail (due to rejection by the system) until the lock owner successfully re-acquires the lock and re-enters the critical section. Additionally these variations may supplement their approach with a maximum time out. If an owning process fails to yield the lock within that time window, it can be terminated thereby establishing an upper bound on any failures due to lack of cooperation.

Figure 6:
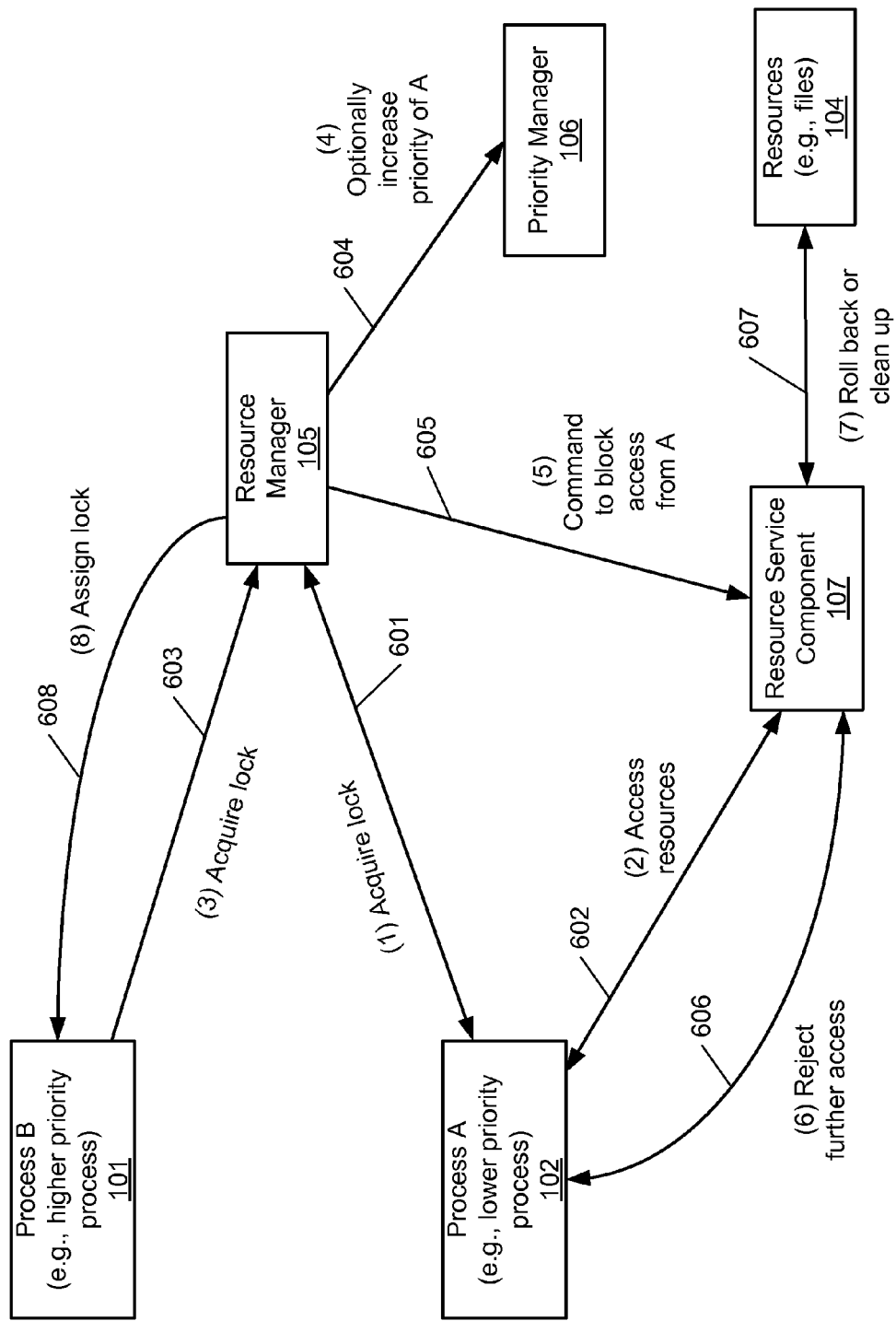
FIG. 6 is a block diagram illustrating a process for resource management according to another embodiment of the invention.

FIG. 6 is a block diagram illustrating a process for resource management according to another embodiment of the invention. Referring to FIG. 6, initially, process 102 (e.g., lower priority process) acquires the lock via path 601 from resource manager 105 and accesses resource 104 via path 602. Subsequently, process 101 (e.g., higher priority process) requests via path 603 to acquire the lock for accessing resource 104. In response to the request, resource manager 105 optionally causes via path 604 priority manager 106 to increase the priority of process 102 to at least match the priority of process 101. In addition, resource manager 105 sends a command via path 605 to resource service component 107 (e.g., IO subsystem) to block any further access to resource 104 from process 102 via path 606. In addition, resource service component 107 performs the actual rollback via path 607. Thereafter, resource manager 105 revokes the ownership of the lock from process 102 and assigns the lock to process 101 via path 608.

In one embodiment, the focus is on file locks for database transactions between database connections typically within different processes. However, embodiments of the invention can also be applicable to other types of critical sections within one or more processes provided a recovery mechanism exists for the critical section's operations such as software transaction memory.

Figure 7:
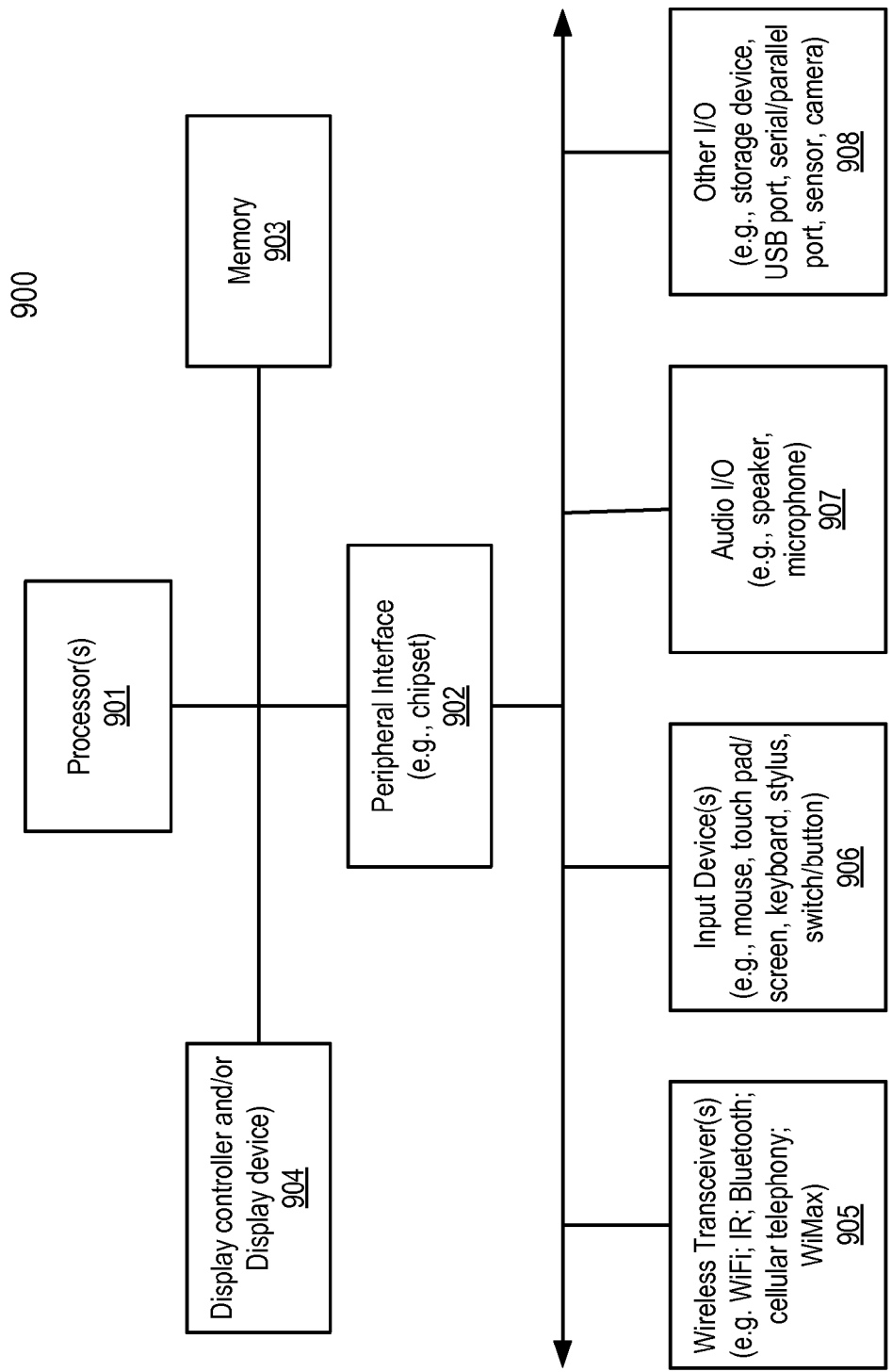
FIG. 7 is a block diagram illustrating an example of a data processing system which may be used with one embodiment of the invention.

FIG. 7 is a block diagram illustrating an example of a data processing system which may be used with one embodiment of the invention. For example, system 900 may represent any of data processing systems described above performing any of the processes or methods described above. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 7, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving, at a resource manager of an operating system of a data processing system, a request from a first process to acquire an exclusive lock for accessing a resource of the data processing system, the first process having a first priority;
increasing by a priority manager of the operating system a second priority of a second process to reduce total lock hold time of the second process, the second process currently in possession of the exclusive lock for performing a transactional operation with the resource, wherein the second priority was lower than the first priority of the first process, wherein the first process and the second process are running within the data processing system;
notifying the second process by the resource manager to indicate that another process is waiting for the exclusive lock, including setting a flag to a predetermined value in a predetermined memory location accessible by the second process, wherein the second process is to periodically poll the predetermined memory location to determine whether another process is waiting for the exclusive lock, wherein in response to the notification, the second process can decide whether to complete or roll back the transactional operation and to release the exclusive lock thereafter;
receiving, by the resource manager, an indication that the second process has released the lock in response to the notification; and
allocating the lock to the first process to allow the first process to access the resource.

2. The method of claim 1, wherein the second priority of the second process is increased to at least match the first priority of the first process.

3. The method of claim 1, further comprising revoking, by the resource manager of the operating system, an ownership of the exclusive lock from the second process after a predetermined period of time if the second process has not released the exclusive lock.

4. The method of claim 1, wherein notifying the second process comprises rejecting further access of the second process to the resource by returning errors in response to current or future input/output (IO) requests to the resource.

5. The method of claim 4, wherein the rejection causes the second process to abort further access of the resource and to release the exclusive lock associated with the resource.

6. The method of claim 4, further comprising:
performing a rollback operation of the transactional operation on behalf of the second process;
revoking an ownership of the exclusive lock from the second process without waiting for the second process to release the exclusive lock; and
assigning the exclusive lock to the first process.

7. A non-transitory machine-readable medium having instructions stored therein, which when executed by a processor, cause the processor to perform a method, the method comprising:
receiving, at a resource manager of an operating system of a data processing system, a request from a first process to acquire an exclusive lock for accessing a resource of the data processing system, the first process having a first priority;
increasing by a priority manager of the operating system a second priority of a second process to reduce total lock hold time of the second process, the second process currently in possession of the exclusive lock for performing a transactional operation with the resource, wherein the second priority was lower than the first priority of the first process, wherein the first process and the second process are running within the data processing system;
notifying the second process by the resource manager to indicate that another process is waiting for the exclusive, including setting a flag to a predetermined value in a predetermined memory location accessible by the second process, wherein the second process is to periodically poll the predetermined memory location to determine whether another process is waiting for the exclusive lock, wherein in response to the notification, the second process can decide whether to complete or roll back the transactional operation and to release the exclusive lock thereafter;
receiving, by the resource manager, an indication that the second process has released the lock in response to the notification; and
allocating the lock to the first process to allow the first process to access the resource.

8. The non-transitory machine-readable medium of claim 7, wherein the second priority of the second process is increased to at least match the first priority of the first process.

9. The non-transitory machine-readable medium of claim 7, wherein the method further comprises revoking an ownership of the exclusive lock from the second process after a predetermined period of time if the second process has not released the exclusive lock.

10. The non-transitory machine-readable medium of claim 7, wherein notifying the second process comprises rejecting further access of the second process to the resource by returning errors in response to current or future input/output (IO) requests to the resource.

11. The non-transitory machine-readable medium of claim 10, wherein the rejection causes the second process to abort further access of the resource and to release the exclusive lock associated with the resource.

12. The non-transitory machine-readable medium of claim 10, wherein the method further comprises:
performing a rollback operation of the transactional operation on behalf of the second process;

revoking an ownership of the exclusive lock from the second process without waiting for the second process to release the exclusive lock; and assigning the exclusive lock to the first process.

13. A data processing system, comprising:
a processor; and
a memory storing instructions, which when executed from the memory, cause the processor to
receive at a resource manager of an operating system a request from a first process to acquire an exclusive lock for accessing a resource of the data processing system, the first process having a first priority,
increase by a priority manager a second priority of a second process to reduce total lock hold time, the second process currently in possession of the exclusive lock for performing a transactional operation with the resource, wherein the second priority was lower than the first priority of the first process, wherein the first process and the second process are running within the data processing system,
notify the second process by the resource manager to indicate that another process is waiting for the exclusive lock, including setting a flag to a predetermined value in a predetermined memory location accessible by the second process, wherein the second process is to periodically poll the predetermined memory location to determine whether another process is waiting for the exclusive lock, wherein in response to the second message, the second process can decide whether to complete or roll back the transactional operation and to release the exclusive lock thereafter, receive, by the resource manager, an indication that the second process has released the lock in response to the notification, and allocate the lock to the first process to allow the first process to access the resource.

14. The system of claim 13, wherein the second priority of the second process is increased to at least match the first priority of the first process.

15. The system of claim 13, wherein an ownership of the exclusive lock is revoked by the resource manager of the operating system from the second process after a predetermined period of time if the second process has not released the exclusive lock.

16. The system of claim 13, wherein notifying the second process comprises rejecting further access of the second process to the resource by returning errors in response to current or future input/output (IO) requests to the resource.

17. The system of claim 16, wherein the rejection causes the second process to abort further access of the resource and to release the exclusive lock associated with the resource.

18. The system of claim 16, wherein the instructions further cause the processor to:
perform a rollback operation of the transactional operation on behalf of the second process,
revoke an ownership of the exclusive lock from the second process without waiting for the second process to release the exclusive lock, and
assign the exclusive lock to the first process.

* * * * *